(Model.) C. B. BRAINARD. 4 Sheets—Sheet 1.
DEVICE FOR MAKING FENCE BARBS.
No. 283,561. Patented Aug. 21, 1883.
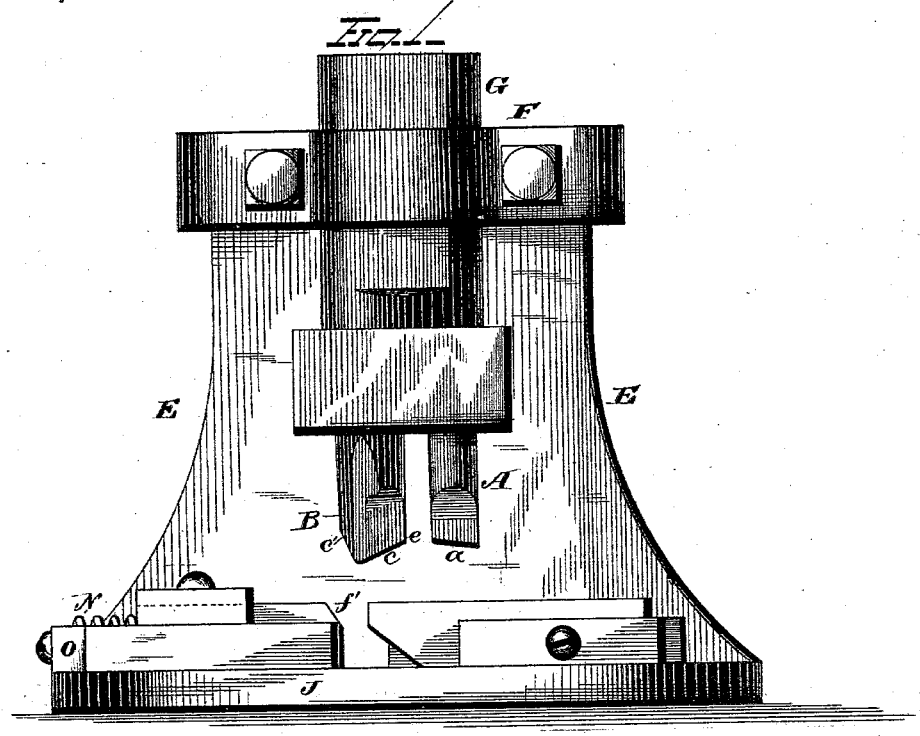
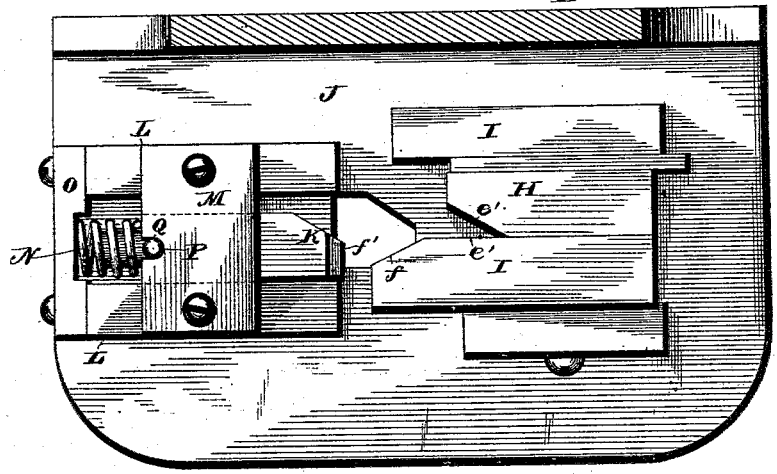
WITNESSES
E. L. Nottingham
Geo. W. Seymour
INVENTOR
Curtis B. Brainard.
By Siggett & Siggett
Attorneys (Model.) 4 Sheets—Sheet 2.
C. B. BRAINARD.
DEVICE FOR MAKING FENCE BARBS.
No. 283,561. Patented Aug. 21, 1883.
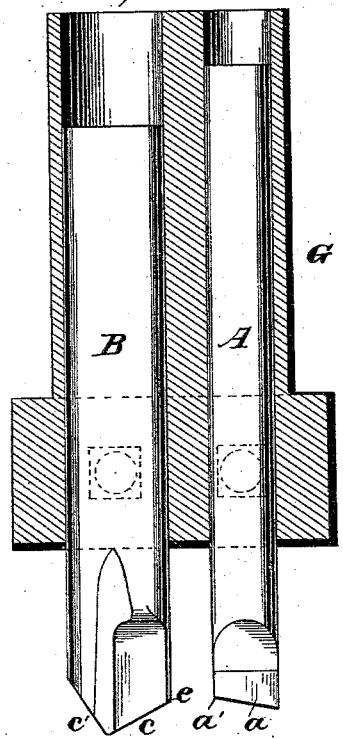
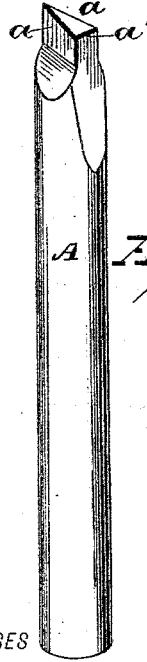
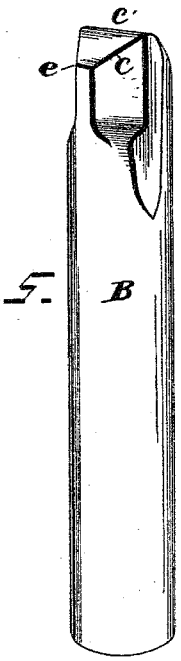
WITNESSES
INVENTOR
Curtis B. Brainard.
By Leggett & Leggett
Attorneys (Model.)
4 Sheets—Sheet 3.
C. B. BRAINARD.
DEVICE FOR MAKING FENCE BARBS.
No. 283,561. Patented Aug. 21, 1883.
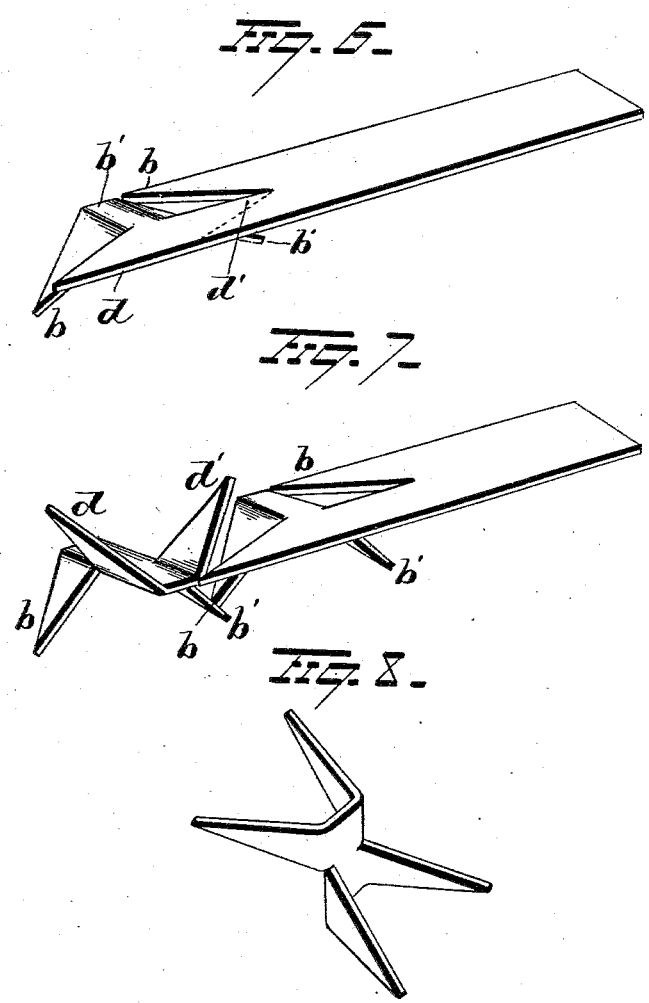
WITNESSES
INVENTOR
Curtis B. Brainard
By Liggett and Liggett
Attorneys (Model.) 4 Sheets—Sheet 4.
C. B. BRAINARD.
DEVICE FOR MAKING FENCE BARBS.
No. 283,561. Patented Aug. 21, 1883.
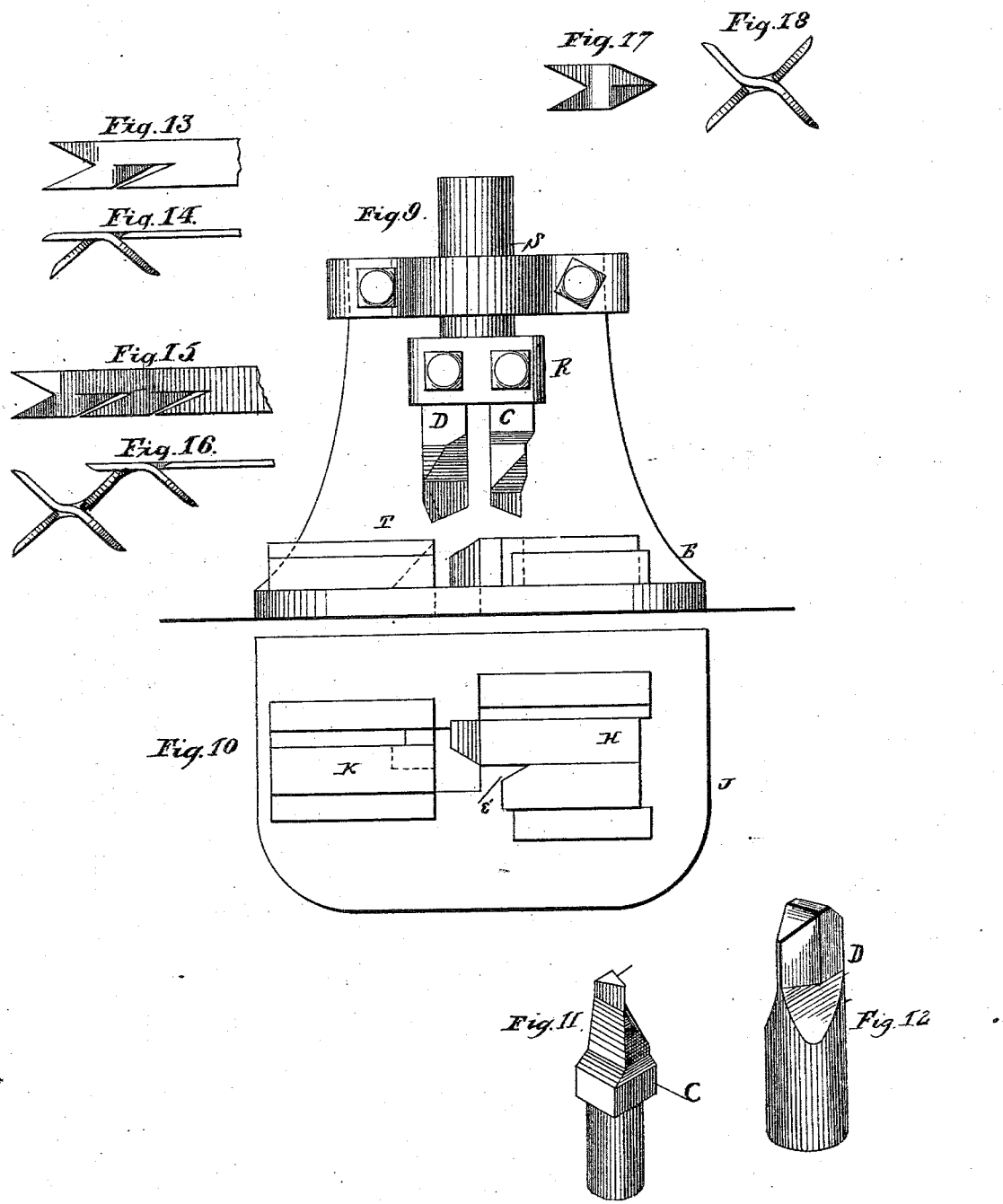

UNITED STATES PATENT OFFICE.

CURTIS B. BRAINARD, OF CUYAHOGA FALLS, ASSIGNOR TO HIMSELF, AND JOHN CROWELL, JR., OF GLENVILLE, OHIO.

DEVICE FOR MAKING FENCE-BARBS.

SPECIFICATION forming part of Letters Patent No. 283,561, dated August 21, 1883.

Application filed July 5, 1881. (Model.)

*To all whom it may concern:*

Be it known that I, CURTIS B. BRAINARD, of Cuyahoga Falls, in the county of Summit and State of Ohio, have invented certain new and useful Improvements in Processes of and Mechanisms for Making Metal Barbs; and I do hereby declare the following to be a full, clear, and exact description of the invention, such as will enable others skilled in the art to which it pertains to make and use it, reference being had to the accompanying drawings, which form part of this specification.

My invention relates to an improvement in machines for making sheet-metal barbs, the object being to produce a machine especially adapted to make that variety of four-pointed barbs which have the points on one side, but in opposite direction from those on the other side.

A further object of my invention is to produce a machine adapted to make the variety of barbs above described with rapidity and without waste of material.

With these objects in view my invention consists in certain details of construction and combinations of parts, as will be hereinafter described, and pointed out in the claims.

In the drawings, Figure 1 is a view in front elevation of mechanism constructed in accordance with my invention. Fig. 2 is a plan view of the bed-plate of the device shown in Fig. 1. Fig. 3 is a view in vertical cross-section of the punch-socket, showing the punches in position therein. Fig. 4 is a perspective view of the punch A. Fig. 5 is a similar view of the punch B. Fig. 6 is a view in perspective of a metallic strip or blank suitable to the formation of barbs, one end of the strip representing the shape thereof at the termination of the first step of the process. Fig. 7 is a similar view, representing the strips at the termination of the second step of the process, a completed barb having just been severed from it. Fig. 8 is a perspective view of a completed barb, the points located on the same side thereof being deflected in the same direction. Fig. 9 is a view in front elevation of a modification of my improvement. Fig. 10 is a plan view of the bed-plate of the device shown in Fig. 9. Fig. 11 is a view in perspective of the punch C. Fig. 12 is a similar view of the punch D. Figs. 13 and 14 respectively represent views in plan and side elevation of a metallic strip or blank as it appears at the termination of the first step of my new process as practiced by the modified mechanism. Figs. 15 and 16 respectively represent similar views of a metallic strip just before the termination of the second step of the process, the barb not being completely severed from the strip; and Figs. 17 and 18 respectively represent views in plan and side elevation of the barb formed by my modified mechanism and process, the points located in the same side thereof being deflected in opposite directions.

The punches and dies are mounted in a frame, E, the head F of which is adapted to receive the vertically-reciprocating plunger G, which is provided with two longitudinal perforations to receive the punches A and B. The punch A is provided with a triangular face, the edges $a$ of which are cutting-edges, the edge $a'$ performing a bending function, as will be hereinafter described. The particular office of this punch is to cut the points $b$ and $b'$ of the barb and bend the point $b'$ thereof.

The essential features of the punch B consist in the cutting-edge $c$, which severs the completed barb from the strip and cuts the points $d$ and $d'$ of the barb, in the bending-face $c'$, which bends the point $d$ cut by the said edge $c$, and in the face $e$, which bends the point $b$ of each barb.

The die H is held in position between two blocks, I, made integral with or attached to the bed-plate J of the frame E. The said die is provided with the cutting-edges $e'$, corresponding to the cutting-edges $a$ of the punch A and of the cutting-edge $f$, which co-operates with the cutting-edge $c$ of the punch B.

The bender K is provided with an inclined face, $f'$, which supports the point $d$ while being bent upwardly by the bending-face $c'$ of the punch B. The said bender is located between two blocks, L, secured to or made integral with the bed-plate J. A plate, M, secured to the upper faces of the blocks L, further aids in retaining the bender in place. A spring, N, interposed between the rear end of the bender and a block, O, secured to the extreme outer ends of the blocks L, is designed to permit the bender to recede sufficiently to prevent breakage of the metal strips or blanks when too brittle to bend. A pin, P, secured to the bender and normally stationed in a slot, Q, formed in the plate M, defines the forward motion of the bender. These devices to permit the binder to recede under certain circumstances may, however, be dispensed with, if desired. In case they are not employed the bender will be mounted upon the bed-plate, substantially as shown in Fig. 10 of the drawings.

Having described in detail the construction of my improved mechanism for bending barbs, I will now proceed to describe the method of its operation.

A metallic strip of suitable character is first introduced beneath the punches for the purpose of removing one of its squared ends and conforming it to the shape of the strip shown in Fig. 6 of the drawings, wherein it is represented as it appears at the termination of the first step of the process of forming every complete barb. During all of the after operations until the metallic strip is used up, the severance of a complete barb from the strip will leave a barb in the first stage of formation, the half-formed barb being completed by the second step of the process. If, now, a strip of metal having one end cut, as shown in Fig. 6, is moved from right to left under the punches and again subjected to their action, the point $d$ will be bent upward by the face $c'$ of the punch B, which presses the point down upon the inclination $f'$ of the bender K, the point $d'$ of the barb will be simultaneously cut and bent by the cutting-edge $c$ of the punch B and the cutting-edge $f$ of the die H, the point $d$ of the barb next to be formed being also formed at the same operation with the formation of the point $d'$ of the barb being now completed. While the punch B is performing the operations above described the cutting-edges of the punch A are operating to cut and bend the point $b'$ of the barb next to be formed, the bending-edge $a'$ of the said punch being engaged in bending the point $b$ of the coming barb. When the second step of the process just above described is completed, the end of the barb will contain a half-formed barb, as shown in Figs. 6 and 7 of the drawings.

It will be observed that after the end of the strip is cut off, as first described, a complete barb will be severed from the strip at every descent of the punches, the barb half formed by one action of the punches being completed by the next succeeding action thereof.

It will be observed by reference to Figs. 1, 3, and 5 of the drawings that the cutting-edge $c$ of the punch B is inclined so that the point $d'$ will be gradually formed. By means of this arrangement the barb is not severed from the strip until the bending-surfaces of the punches have imparted the desired form to it, and also, by gradually cutting the said point simultaneously with the operation of bending other parts of the barb, the point is itself given the appropriate deflection with relation to the other points of the same barb.

The modified mechanism shown in Figs. 9 and 10 of the drawings is designed to be employed in the manufacture of metallic barbs wherein the points located on the same side of the barb are deflected in opposite directions. The punch C employed in connection with this modified mechanism is substantially the same in form as the punch A, before described. It has a short shank, which is adapted to be secured in the head R of the plunger S. The punch D, which is also adapted to be secured to the said head R, has cutting and bending edges and faces which perform substantially the functions ascribed to the punch B. The die H is exactly reversed from the position in which it is shown in Fig. 2 of the drawings, in order that its cutting-edges $e'$ may co-operate with the edges $a$ of the punch C in forming those points which are cut from the outer edge of the metallic strip. The bender K is cut away at T to bend one point of the barb downward, while the devices for permitting it to recede, as before described, are dispensed with.

The punches C and D, in conjunction with the die H and bender K, form the barb in substantially the same manner as described for the other process, a half-formed barb being left on the end of the strip at the completion of the formation of every complete barb. I would therefore have it understood that I do not limit myself to the exact construction and combination of parts herein shown, but that I hold myself at liberty to make such slight changes and alterations as fairly fall within the spirit and scope of my invention.

I am aware that it is not new to cut pointed sheet-metal barbs from blank strips, and to bend the points of the barbs simultaneously or nearly simultaneously with cutting them.

I am also aware that it is not new to employ a punch having cutting-edges and bending-faces in conjunction with a die having cutting-edges in the production of pointed sheet-metal barbs. I do not therefore broadly claim the production of pointed sheet-metal barbs from metal strips, nor punches and dies for forming them, my invention consisting in the peculiar construction and arrangement of punches, a die, and other parts, substantially as herein shown, described, and claimed.

Having thus fully described my invention, what I claim as new, and desire to secure by Letters Patent, is—

1. In a machine for making sheet-metal barbs, the combination, with the punch A, having a beveled triangular face, and provided with the cutting-edges $a\ a$ and the bending-edge $a'$, of the punch B, or its equivalent, and the die E, substantially as set forth.

2. In a machine for making sheet-metal barbs, the combination, with the punch A, having a beveled triangular face, and provided with the cutting-edges $a\ a$ and the bending-edge $a'$, of the punch B, or its equivalent, the die E, having cutting-edges to co-operate with the cutting-edges of both punchers and a bender, substantially as set forth.

In testimony whereof I have signed my name to this specification in the presence of two subscribing witnesses.

CURTIS B. BRAINARD.

Witnesses:
ALBERT E. LYNCH,
ERNEST O. ORSBURN.